(12) United States Patent
Maharmeh et al.

(10) Patent No.: US 12,372,311 B2
(45) Date of Patent: *Jul. 29, 2025

(54) METHODS AND SYSTEMS FOR MEASURING STATE OF CHARGE OF A PHASE CHANGE MATERIAL THERMAL BATTERY

(71) Applicant: Rolls-Royce North American Technologies Inc., Indianapolis, IN (US)

(72) Inventors: Nader Maharmeh, Indianapolis, IN (US); Craig English, Indianapolis, IN (US); Eric Donovan, Indianapolis, IN (US); Eugene Jansen, Indianapolis, IN (US); Ryan Young, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/424,195

(22) Filed: Jan. 26, 2024

(65) Prior Publication Data

US 2024/0210121 A1 Jun. 27, 2024

Related U.S. Application Data

(63) Continuation of application No. 17/104,339, filed on Nov. 25, 2020, now Pat. No. 11,920,871.

(51) Int. Cl.
*F28D 20/02* (2006.01)
*G01K 17/00* (2006.01)
(Continued)

(52) U.S. Cl.
CPC ............. *F28D 20/028* (2013.01); *G01K 1/00* (2013.01); *G01K 17/00* (2013.01); *G01N 25/00* (2013.01)

(58) Field of Classification Search
CPC .......... G01K 1/00; G01K 17/00; G01N 25/00; F28D 20/028
See application file for complete search history.

(56) References Cited

U.S. PATENT DOCUMENTS 7,225,860 B2 6/2007 Baginski et al.
8,697,271 B2 4/2014 Fujiwara
(Continued)

FOREIGN PATENT DOCUMENTS

KR 10170574 B1 2/2017
WO WO-2015051474 A1 * 4/2015 ......... B65D 81/3813

OTHER PUBLICATIONS

Tilman Barz et al., "State and state of charge estimation for a latent heat storage," Control Engineering Practice, dated 2018, pp. 1-40, 72, available by Elsevier at URL https://doi.org/10.1016/j.conengprac.2017.11.006.

(Continued)

*Primary Examiner* — Paul Alvare
(74) *Attorney, Agent, or Firm* — Barnes & Thornburg (57) ABSTRACT

A thermal battery system includes a vessel comprising a phase change material and a gas; a heat exchanger configured to transfer heat to and/or from the phase change material; a temperature sensor configured to detect an indication of a temperature of the gas; a pressure sensor configured to detect an indication of a pressure of the gas; and a processor configured to determine a state of charge of the thermal battery system from the indication of the pressure and the indication of the temperature of the gas.

11 Claims, 7 Drawing Sheets

(51) Int. Cl.
   *G01K 1/00*       (2006.01)
   *G01N 25/00*      (2006.01)

(56) References Cited

U.S. PATENT DOCUMENTS

| | | |
|---|---|---|
| 9,496,588 B2 | 11/2016 | Nguyen et al. |
| 9,612,059 B2 | 4/2017 | Xiang |
| 10,088,243 B2 | 10/2018 | Grama et al. |
| 10,471,803 B2 * | 11/2019 | Bidner ............... B60H 1/00885 |
| 11,002,493 B2 * | 5/2021 | Bidner .................. F28D 20/021 |
| 2012/0118554 A1 * | 5/2012 | Mathur .................. F28D 20/02 |
| | | 165/287 |
| 2012/0216981 A1 | 8/2012 | Bank |
| 2012/0255706 A1 * | 10/2012 | Tadayon ................. F24T 10/10 |
| | | 165/47 |
| 2013/0265722 A1 | 10/2013 | Hill et al. |
| 2015/0345873 A1 | 12/2015 | Sasakura |
| 2016/0195340 A1 * | 7/2016 | Bissell .................... F28D 20/02 |
| | | 165/10 |
| 2021/0318028 A1 * | 10/2021 | Bissell .................. F28D 20/028 |

OTHER PUBLICATIONS

Translation of Korean Patent Document KR10170574B1 entitled Translation—KR10170574B1 (Year: 2023).

* cited by examiner

METHODS AND SYSTEMS FOR MEASURING STATE OF CHARGE OF A PHASE CHANGE MATERIAL THERMAL BATTERY

CROSS-REFERENCE TO RELATED APPLICATIONS

This application is a continuation of co-pending U.S. Non-Provisional patent application Ser. No. 17/104,339, filed Nov. 25, 2020. The contents of U.S. Non-Provisional patent application Ser. No. 17/104,339 are herein incorporated by reference in their entirety.

TECHNICAL FIELD

This disclosure relates to thermal battery systems, more specifically to methods and systems for measuring a thermal capacity of thermal batteries with phase change material.

BACKGROUND

Phase change materials may be a mixture of phases during a phase change. In other words, different phases (such as solid and liquid) may be intermixed throughout an amount of phase change material. Further, liquid-phase phase change material may be trapped in pockets, surrounded by solid-phase phase change material, and different phases of phase change material often do not separate homogeneously. Conventional methods for determining the state of charge (SoC) of a thermal battery system may be inaccurate due to various physical effects during a phase change. The state of charge may be considered the thermal storage capacity of the thermal battery, or how much more energy the thermal battery is able to store or release. The state of charge may also be considered the maximum instantaneous heat duty the thermal battery is capable of.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

The drawings described herein are for illustration purposes only and are not intended to limit the scope of the present disclosure in any way.

DETAILED DESCRIPTION

In one example, a thermal battery system is provided comprising: a vessel comprising a phase change material and a gas; a heat exchanger configured to transfer heat to and/or from the phase change material; a temperature sensor configured to detect an indication of a temperature of the gas; a pressure sensor configured to detect an indication of a pressure of the gas; and a processor configured to determine a state of charge of the thermal battery system from the indication of the pressure and the indication of the temperature of the gas.

In another example, a thermal battery system is provided comprising: a vessel comprising a phase change material; a heat exchanger configured to transfer heat to and/or from the phase change material; a plurality of temperature sensors configured to detect an indication of a plurality of temperatures in a plurality of corresponding volumes of the phase change material, and a processor configured to determine a real-time heat duty of the thermal battery system based on the indication of the temperatures detected by the temperature sensors.

One interesting feature of the systems and methods described below may be that the thermal battery systems of the present disclosure provide for real-time, relatively accurate measurement of the state of charge of the phase change material in the thermal battery system by detection of indications of temperature and pressure of gas in the space above the phase change material. Alternatively, or in addition, an interesting feature of the systems and methods described below may be that thermal battery system sizes may be reduced (instead of being oversized) because of the ability to accurately determine the state of charge of phase change material in thermal battery systems. Alternatively, or in addition, an interesting feature of the systems and methods described below is the ability to supplement cooling or heating capacity of thermal management systems with a thermal battery system, and, for example, to determine before increasing a thermal load whether the cooling or heating capacity of the thermal management system, together with the cooling or heating capacity of the thermal battery system, is enough to handle the increased thermal load. The cooling or heating capacity of the thermal battery system means thermal storage capacity and/or real-time cooling or heating capacity (in other words, heat duty).

For purposes of promoting an understanding of the principles of the disclosure, reference will now be made to the examples illustrated in the drawings, and specific language may be used to describe the same. It will nonetheless be understood that no limitation of the scope of the disclosure is intended by the illustration and description of certain examples of the disclosure. In addition, any alterations and/or modifications of the illustrated and/or described example(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

Figure 1:
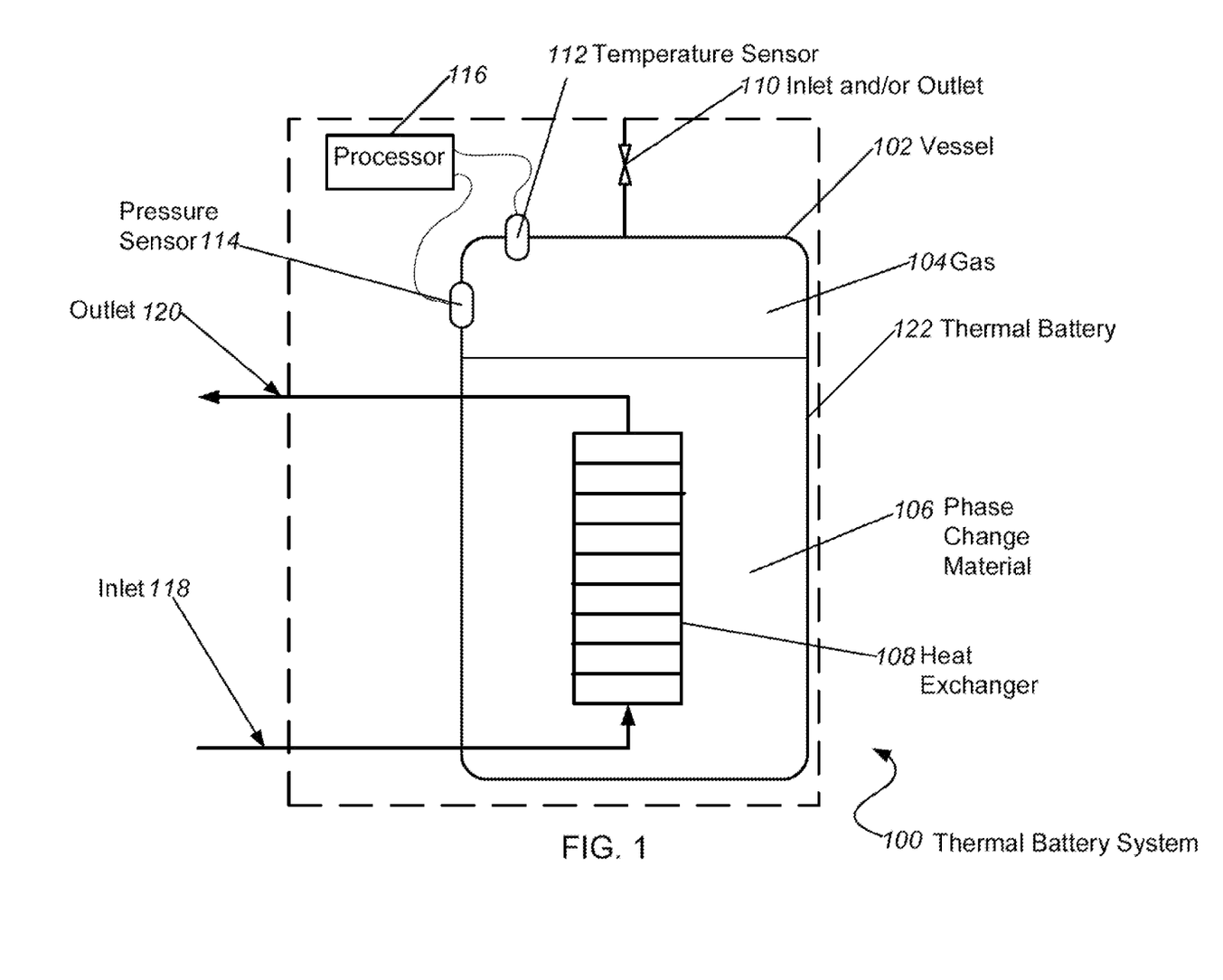
FIG. 1 illustrates an example of a thermal battery system.

FIG. 1 illustrates an example of a thermal battery system 100. In the illustrated example, the thermal battery system 100 includes a vessel 102, which contains a phase change material 106 and a gas 104. In the illustrated example, the gas 104 is in a space above the phase change material 106. The thermal battery system 100 includes a heat exchanger 108 in contact with the phase change material 106. The heat exchanger 108 is configured to transfer heat to and/or from the phase change material 106. The heat exchanger 108 is located within the vessel 102. The heat exchanger 108 may include an inlet 118 and an outlet 120. Depending on the direction of fluid flow, the inlet 118 of the heat exchanger 108 may operate as an outlet, and the outlet 120 of the heat exchanger 108 may operate as an inlet. The arrows showing the direction of fluid flow in FIG. 1 may be reversed if the direction of fluid flow through the inlet 118 and the outlet 120 reverses. Consequently, the arrows showing the direction of fluid flow and the names "inlet" and "outlet" are not meant to be limiting in any way.

In addition, the vessel 102 may include an inlet and/or an outlet 110. In FIG. 1, a valve and a conduit connected to the valve operate as both an inlet and an outlet to the vessel 102. The thermal battery system 100 includes a temperature sensor 112 configured to detect an indication of a temperature of the gas 104. The thermal battery system 100 further includes a pressure sensor 114 configured to detect an indication of a pressure of gas 104. The thermal battery system 100 further includes processor 116 in communication with temperature sensor 112 and pressure sensor 114. As explained further below, the processor 116 is configured to determine a state of charge of the phase change material 106 from the indication of the pressure and the indication of the temperature of the gas 104.

The vessel 102 may be any container or tank capable of handling the operating pressures and temperatures without rupturing. The vessel 102 may be constructed so as to be rigid enough not to deform during operation. This rigidity permits the volume of the tank to remain substantially constant during operation. The vessel 102 may have any shape or size. The vessel 102 may be made of any suitable material, such as a metal, a plastic, a composite, and/or a ceramic.

The phase change material 106 may be any phase change material known in the art to undergo a phase change from a first phase of matter (for example, solid) to a second phase of matter (for example, liquid) when absorbing energy yet remaining at a relatively constant temperature (in other words, absorbing latent heat), and to undergo a phase change from the second phase of matter to the first phase of matter when releasing energy yet remaining at relatively constant temperature (in other words, releasing latent heat). More specifically, the phase change material 106 may be any substance having sufficient latent heat to provide useful heat and/or cooling. For example, the phase change material 106 and the quantity of the phase change material 106 may be selected so that the specific latent heat of the phase change material 106 multiplied by the total mass of the phase change material 106 is greater than or equal to a predetermined amount of thermal energy needed for the thermal battery system 100. Examples of the phase change material 106 may include a wax, paraffin, a fatty acid, or polyethylene glycol. The gas 104 may be any gas that remains in a gaseous state under the conditions found within the vessel 102 during operation of the thermal battery system 100. The gas 104 may be, for example, a common vapor-phase gas, such as gaseous nitrogen ($N_2$), or a mixture of common atmospheric gases, such as gaseous oxygen ($O_2$) and nitrogen. In examples where the gas 104 may come into contact with the phase change material 106, the gas 104 may be any gas that does not react with the phase change material 106 when the phase change material 106 is a liquid or a solid.

The heat exchanger 108 may be any suitable heat exchanger known in the art for thermally contacting a phase change material, and transferring heat between the phase change material and a refrigerant flowing through the heat exchanger 108. Examples of the heat exchanger 108 may include a shell and tube, a brazed/welded plate, a plate-fin, a tube-in-tube, a tube-fin, or any other type of heat exchanger.

The temperature sensor 112 may include one or more sensors capable of detecting the indication of the temperature of the gas 104. The temperature sensor 112 may be embedded within and/or be located in the interior of the vessel 102. Examples of the temperature sensor 112 include a thermocouple, a resistance thermometer, or any other device configured to detect temperature.

As shown in FIG. 1, the temperature sensor 112 may project into the gas 104. The indication of the temperature of gas 104 may be a temperature reading from the temperature sensor 112.

The pressure sensor 114 may include one or more sensors. The pressure sensor 114 is in direct fluid communication with the gas 104 so as to be capable of detecting the pressure of the gas 104. Examples of the pressure sensor 114 include a pressure transducer, a pressure gauge, and a strain gauge.

Figure 5:
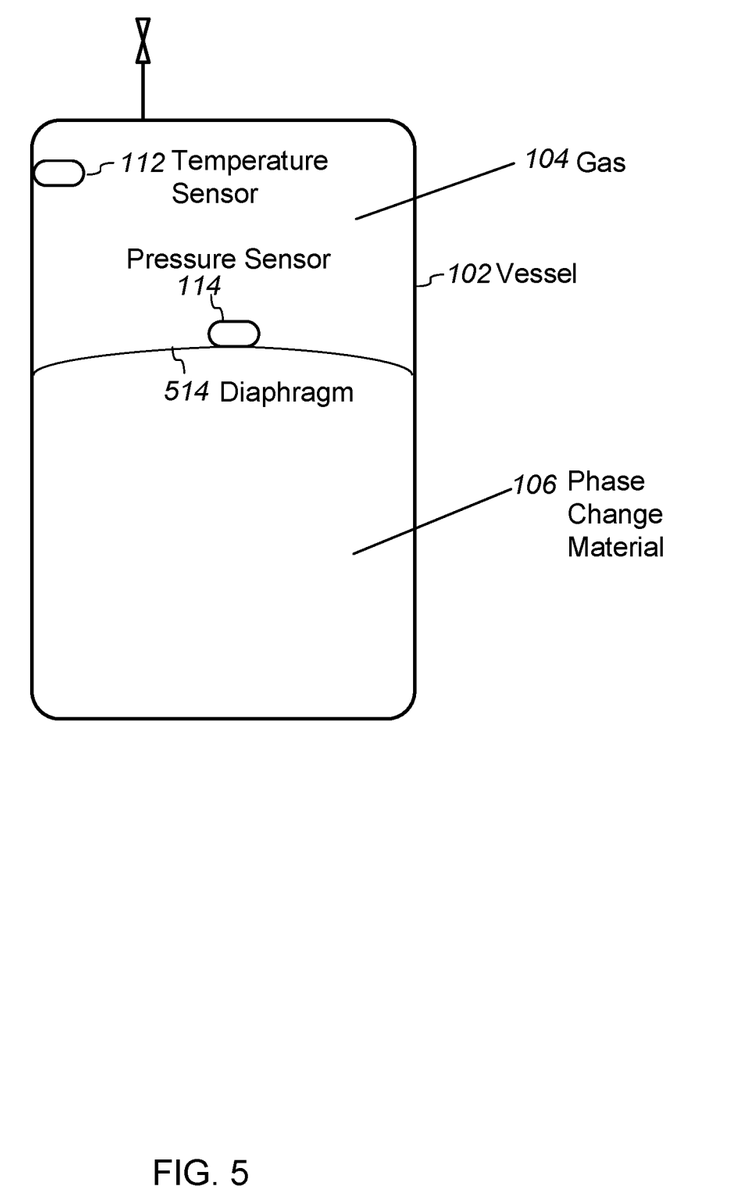
FIG. 5 illustrates an example in which the vessel includes a diaphragm disposed between gas and the pressure sensor.

As shown in FIG. 1, the pressure sensor 114 may be embedded in the vessel 102. The indication of the pressure of the gas 104 may be the pressure of the gas 104 or any indication thereof. FIG. 5 illustrates an example in which the vessel 102 includes a diaphragm 514 disposed between gas 104 and the pressure sensor 114. The diaphragm 514 is made of a flexible material, such as rubber or plastic. In some examples, like the one illustrated, the diaphragm 514 may be part of the pressure sensor 114. For example, the pressure sensor 114 may include a strain gauge that measures the deflection of the diaphragm 514. The diaphragm 514 may have a known modules of elasticity from which the indication of the pressure may be determined together with a reading from the strain gauge. Alternatively or in addition, the diaphragm 514 may help limit the chance that the pressure sensor 114 becomes clogged by particles and, as a result, may provide more consistent measurements (in other words, increasing precision in measurement of pressure of gas 104).

The processor 116 may communicate with the temperature sensor 112 and the pressure sensor 114 in FIG. 1. In particular, the processor 116 may receive the indication of the temperature of the gas 104 received from the pressure sensor 114 and the temperature sensor 112. With indications of the temperature and the pressure of gas 104, the processor 116 of the thermal battery system 100 may determine the state of charge of the phase change material 106 as described below.

To understand how the state of charge is determined, it should be noted that the phase change material 106 selected for use in the thermal battery system 100 has a measurable difference in density when the phase change material 106 is in a solid phase versus when the phase change material 106 is in a liquid phase. The thermal battery system 100 may leverage this fact when there is a mixture of phases of the phase change material 106 in the vessel 102. The change in density when changing state causes a change in pressure of the gas 104.

The pressure sensor 114 may measure the pressure as the phase change material 106 changes state. During this phase change, the temperature of the phase change material 106 remains relatively constant (specifically, the phase transition temperature of the phase change material 106). The phase change material 106 selected may change phase over a relatively small band of phase transition temperatures instead of at a single phase transition temperature. Although the phase change material 106 remains at this relatively constant temperature during the phase change, the portions of the phase change material 106 that are liquid will have a lower density than the portions of the phase change material 106 that are solid. Therefore, as more and more of the phase change material 106 adsorbs thermal heat and turns into a liquid, the phase change material 106 will expand (or contract depending on the selected material) and, correspondingly, exert more (or less) force on the gas 104. The pressure sensor 114 may measure the expansion (or contraction) through the change in pressure in the gas 104. In other words, the change in pressure of the gas 104 corresponds to the change in volume of the phase change material 106. Therefore, the amount of the phase change material 106 in a solid state (and/or liquid) may be indirectly measured by the pressure sensor 114.

The total volume of vessel 102 corresponds to the sum of the volume of gas 104 and the volume of the phase change material 106, according to equation (1):

$$V_g + V_{PCM} = V_{total} \quad (1)$$

wherein $V_g$ corresponds to the volume of gas 104, $V_{PCM}$ corresponds to the volume of phase change material ("PCM") 106, and $V_{total}$ corresponds to the total volume of vessel 102.

The density of gas 104 and phase change material 106 may be related to the volumes according to equations (2) and (3), respectively:

$$V_g = \frac{m_g}{\rho_g} \quad (2)$$

$$V_{PCM} = \frac{m_{PCM}}{\rho_{PCM}} \quad (3)$$

wherein $m_g$ corresponds to the mass of gas 104 in vessel 102, $\rho_g$ corresponds to the density of gas 104 in vessel 102, $m_{PCM}$ corresponds to the mass of phase change material 106 in vessel 102, and $\rho_{PCM}$ corresponds to the density of phase change material 106 in vessel 102 at nominal conditions when the thermal battery system is manufactured, assembled, and/or setup.

Equations (1), (2), and (3), together with the ideal gas law, provide equation (4) as follows:

$$V_{total} = \frac{m_g}{P_g/RT_g} + \frac{m_{PCM}}{fn(h_{PCM})} \quad (4)$$

wherein $P_g$ corresponds to the pressure of gas 104, an indication of which is provided by pressure sensor 114, R corresponds to the ideal gas constant, $T_g$ corresponds to the temperature of gas 104, an indication of which is provided by temperature sensor 112, and $fn(h_{PCM})$ is the density of the phase change material 106 written as a function of the average enthalpy of the phase change material 106.

Rearranging equation (4) to solve for $fn(h_{PCM})$ results in equation (5):

$$fn(h) = \frac{m_{PCM}P_g}{V_{total}P_g - m_g R_g T_g} \quad (5)$$

The only variables on the right-hand side of the equal sign that are not known prior to performing the calculation are the pressure of the gas 104 ($P_g$) and the temperature of the gas 104 ($T_g$). On the left-hand side of the equal sign is only fn(h), which is shorthand for $fn(h_{PCM})$. As indicated above, $fn(h_{PCM})$ is the density of the phase change material 106 written as a function of the average enthalpy of the phase change material 106. The average enthalpy of the phase change material 106 is directly related to the thermal storage capacity of the phase change material 106. In general, a relationship between enthalpy of the phase change material 106 and the density of the phase change material 106 and/or other physical characteristics of the phase change material 106 may be provided, for example, by the manufacturer or supplier of the phase change material 106. Alternatively or in addition, that relationship may be experimentally obtained for the phase change material 106. In such examples, $h_{PCM}$ may be calculated from $P_g$ and $T_g$ and the predetermined relationship between enthalpy of the phase change material 106 and the density of the phase change material 106. Alternatively, as explained further below, the exact relationship between the average enthalpy of the phase change material 106 and the density of the phase change material 106 may not even need to be determined.

An important conclusion that may be taken from equation (5) is that the average enthalpy of the phase change material 106 really just depends on the pressure of the gas 104 ($P_g$) and the temperature of the gas 104 ($T_g$) (because $P_g$ and $T_g$ together indicate the specific volume of the phase change material 106). The percentage charge may be calculated as, for example $(h_{current} - h_{final})/(h_{starting} - h_{final})$, where $h_{starting}$ is the average enthalpy of the phase change material 106 fully charged, $h_{final}$ is the average enthalpy of the phase change material 106 fully depleted, and $h_{current}$ is the average enthalpy of the phase change material 106 at the time the percent charge is to be determined.

The vessel 102 may be considered a "closed system" (the inlet and/or outlet 110 of the vessel 102 is assumed to be closed during operation of the thermal battery system 100). In other words, the mass of the gas 104 ($m_g$), the mass of the phase change material 106 ($m_{PCM}$), and the total volume of the vessel 102 ($V_{total}$) are relatively constant. The temperature sensor 112 may detect the indication of the temperature of gas 104 and the pressure sensor 114 may detect the indication of pressure of gas 104.

In order to determine the state of charge of the phase change material 106 (also referred to as the thermal storage capacity of thermal battery system 100) using equation (5) above, the processor 116 may first convert the indication of the temperature of the gas 104 ($T_g$) and the indication of the pressure of the gas 104 ($P_g$) to the temperature of the gas 104 ($T_g$) and the pressure of the gas 104, respectively, if the indications are not already the temperature of the gas 104 ($T_g$) and the pressure of the gas 104, respectively. Tables and/or formulas for such a conversation may be determined in advance. For example, if the indication of the pressure of the gas 104 is a strain measurement detected by a strain gauge, then the stain measurement may be converted to a stress using a modulus of elasticity of the material of the diaphragm, and the pressure of the gas 104 may be derived from the stress. As another example, if the indication of the temperature of the gas 104 ($T_g$) is a resistance measurement, the resistance measurement may be converted to a temperature value.

Alternatively or in addition, the processor 116 may determine the state of charge of the phase change material 106 by looking up the indication of the pressure and the indication of the temperature in a mapping (for example, a table) of pressure and temperature combinations and the corresponding state of charge of the phase change material 106. For example, the pressure and temperature combinations in the mapping may be unconverted values from the pressure sensor 114 and temperature sensor 112. The processor 116 may not need to convert the indication of the pressure to the pressure, or the indication of the temperature to the temperature, because the indications may be simply looked up in the mapping. In some examples, one or more parameters in addition to the pressure and temperature may be part of the lookup in the mapping. The mapping may be populated with experimentally obtained data and/or with results of applying the above calculations. For example, the mapping may include a corresponding state of charge, a phase change material density, a specific volume of the phase change material density, and/or any other relevant value.

In an example of the mapping including a map of a phase change material density to the state of charge, the processor 116 may determine the phase change material density from the indication of the pressure and the indication of the temperature of the gas 104. In particular, the processor 116 may determine the volume of the phase change material 106 by determining the volume of the gas 104 using the ideal gas law (PV=nRT), and subtracting the volume of the gas 104 from the total volume of the vessel 102. The processor 116 may divide the total mass of the phase change material 106 by the volume of the phase change material 106. The processor 116 may look up the state of charge in the mapping with the phase change material density.

The thermal battery system 100 may have additional, fewer, or different components than those described herein above. Alternatively or in addition, each of the components may include additional, fewer, or different sub components than those described above. For example, a thermal battery 122 of the thermal battery system 100 may include the vessel 102, the phase change material 106, the gas 104, and the heat exchanger 108. As another example, the thermal battery system 100 may include one or more than one type of pressure sensor 114 and/or temperature sensor 112. As still another example, the thermal battery system 100 may not include the inlet and/or the outlet 110 of the vessel 102. In yet other examples, the processor 116 may not be included in the thermal battery system 100, and instead, be included in a different system.

In some examples, the gas 104 and/or the phase change material 106 in the vessel 102 may be tuned or adjusted prior to use in order to improve the accuracy of the state of charge measurements and/or to better match range characteristics of sensors. For example, the amount of the phase change material 106 in the vessel 102 may be changed or adjusted through, for example, the inlet and/or the outlet 110. By increasing the amount of phase change material 106, the space in the vessel 102 available to the gas 104 decreases. The reduction in space available to the gas 104 amplifies the magnitude of the pressure fluctuations of the gas 104 due to the phase change material 106 expanding and/or contracting. This increased sensitivity may improve the fidelity of the measurement of the statue of charge. On the other hand, care is to be taken not to decrease the space available to the gas 104 too much or the pressure increase from the expanding phase change material 106 may be destructive to the vessel 102 or other structures. As another example, if the pressure sensor 114 has a more accurate range from, say 30 to 100 psi, then the vessel 102 may be pressurized to a pressure in a lower portion of the range in order to have an initial baseline measurement to which the sensor is calibrated to.

The gas 104 may be at ambient atmospheric pressure or a controlled or a predetermined pressure above or below ambient atmospheric pressure.

The processor 116 may be in communication with a memory (not shown). In an example, processor 116 may also be in communication with additional elements, such as a display (not shown) and/or other processors (not shown). Examples of the processor 116 may include a controller, a general processor, a central processor, a central processing unit, a microcontroller, a proportional-integral-derivative (PID) controller, a server, an application specific integrated circuit ("ASIC"), a digital signal processor, a field programmable gate array ("FPGA"), a digital circuit, and/or an analog circuit.

The processor 116 may be one or more devices operable to execute logic. The logic may include computer executable instructions or computer code embodied in the memory or in other memory that, when executed by the processor 116, may cause the processor 116 to perform the features implemented by the logic, such as logic in examples of flow diagrams 300 and 400 in FIGS. 3 and 4, respectively. In some examples, the processor 116 may be part of a feedback loop to control the operation of the thermal management system based upon the remaining thermal storage capacity (state of charge) of the thermal battery system as described herein. The processing capability of the processor 116 may be distributed across multiple entities, such as among multiple processors and memories, optionally including multiple distributed processing systems.

Figure 2:
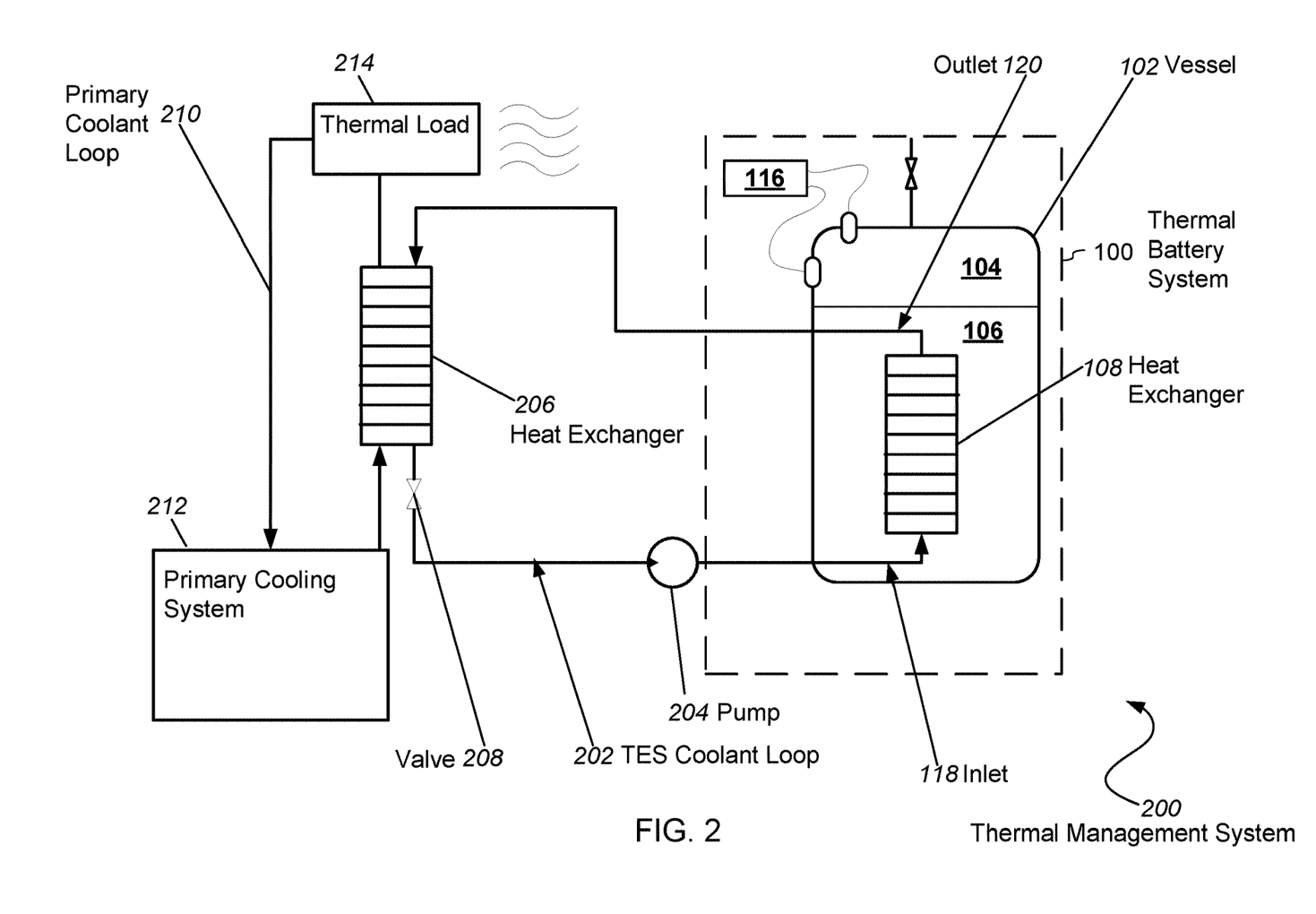
FIG. 2 illustrates a schematic of an example of a thermal management system configured to cool a thermal load with an example of a thermal battery system.

FIG. 2 illustrates a schematic of an example of a thermal management system 200 configured to cool a thermal load 214 with a primary cooling system 212 and the thermal battery system 100. The thermal management system 200 may include the primary cooling system 212 and the thermal battery system 100. The primary cooling system 212 may be any type of active cooling system, such as a vapor cycle system.

The thermal management system 200 in FIG. 2 includes a TES coolant loop 202 in which a coolant is disposed. The TES coolant loop 202 may include one or more components, such as the thermal battery system 100, a pump 204 configured to force the coolant through the heat exchanger 108 of the thermal battery system 100 and around the TES coolant loop 202. The TES coolant loop 202 may further include a heat exchanger 206 configured to transfer heat between the coolant in the TES coolant loop 202 and coolant in a primary coolant loop 210, which includes the primary cooling system 212. The TES coolant loop 202 may further include a valve 208 configured to control flow of the coolant through the TES coolant loop 202. The coolant in the TES coolant loop 202 may flow through the heat exchanger 108 of the thermal battery system 100 via the inlet 118 and the outlet 120. The heat exchanger 108 may transfer heat between the phase change material 106 and the coolant in the TES coolant loop 202.

The primary cooling system 212 is configured to cool the thermal load 214 via the primary coolant loop 210. The thermal battery system 100 may supplement the cooling capacity of the primary cooling system 212 in order to cool the thermal load 214. However, before supplementing with the thermal battery system 100, the thermal management system 200 may obtain the state of charge of the phase change material 106 of the thermal battery system 100. For example, the processor 116 determines the state of charge of the thermal battery system 100 from the indication of the pressure and the indication of the temperature of the gas;

The thermal management system 200 (for example, the processor 116) determines if a cooling capacity of the primary cooling system 212 plus the state of charge of the thermal battery system 100 is at least as large as the thermal load 214. Next, the processor 116 or some other processor causes the primary cooling system 212 and the thermal battery system 100 to cool the coolant in the primary coolant loop 210 (and thus the thermal load 214) if the cooling capacity of the primary cooling system 212 plus the state of charge of the thermal battery system 100 is at least as large as the thermal load 214. Advantageously, the primary cooling system 212 and the thermal battery system 100 may be smaller than otherwise possible due to the ability of the thermal battery system 100 to accurately determine the state of charge of the phase change material 106. Without such an ability, the thermal battery system 100 and/or the primary cooling system 212 would have to be designed to be larger in order to compensate for a potential measurement error.

The processor 116 may be in communication with the primary cooling system 212, the thermal load 214, the valve 208, and/or the pump 204. The processor 116 may be configured to cause the thermal battery system 100 to transfer heat from the phase change material 106 to the coolant in the TES coolant loop 202 when the state of charge of phase change material 106 is at or below a recharge level. In some examples, the processor 116 may be configured to cause the thermal battery system 100 to transfer heat from the coolant in the TES coolant loop 202 to the phase change material 106 when the state of charge is at or above a predetermined charge level.

In an example of thermal management system 200, the thermal load 214 may be a directed energy weapon that damages a target with focused energy, such as a laser, a microwave beam weapon, or a particle beam weapon. The primary cooling system 212 may cool the thermal load 214. By including the thermal battery system 100, more shots and/or higher energy shots may be fired by the directed energy weapon in a particular timeframe in a particular operating environment. To avoid overheating the directed energy weapon, the processor 116 may determine, in advance of firing a subsequent shot, whether the primary cooling system 212 together with the thermal battery system 100 may adequately cool thermal load 214. The processor 116 may do this by determining that the thermal capacity of primary cooling system 212 in addition to the state of charge of phase change material 106 of thermal battery system 100 is at least as large as thermal load 214 that may result from firing the subsequent shot.

The thermal management system 200 is described above in conjunction with cooling the thermal load 214 in the form of a directed energy weapon. Alternatively or in addition, the incorporation and use of the thermal management system 200 in other industrial and military applications that include any other type of thermal load is contemplated to be within the scope of the present disclosure. For example, the thermal load 214 may include any apparatus, device, or combination of apparatuses or devices that consume electricity and may benefit from cooling. Examples of which may include solid state electronics, a light-emitting diode ("LED"), an analog circuit, a digital circuit, a computer, a server, a server farm, a data center, a hoteling circuit such as vehicle electronics, a vehicle such as an aircraft, a plasma weapon, a railgun, a microwave generator, a pulse-powered device, a satellite uplink, an electric motor, an electric device, or the like. The heat arising during the operation of such an apparatus may be transient and transferred into thermal management system 200, by any means known in the art, including, but not limited to, using a two-phase pump loop, a fluid or fluid mixture system, or an air conditioning system in conjunction with any type of fluid, coolant, or refrigerant.

The heat exchanger 206 may be any suitable heat exchanger known in the art for contacting a phase change material, and adding heat to and/or extracting heat from the phase change material. Examples of the heat exchanger 206 include a parallel-flow, counter-flow, multi-pass-flow, or cross-flow heat exchanger.

The valve 208 may be an in-line valve or gate valve, and may be open, partially open, or closed as is necessary, desirable, or preferable to a particular operation of the TES coolant loop 202.

The pump 204 may be configured to increase pressure of the coolant in the TES coolant loop 202 and may provide workflow to move the coolant downstream within the TES coolant loop 202.

In some examples, the primary cooling system 212 may include a two-phase pump loop ("TPPL"), one or more vapor compression systems ("VCS"), and/or one or more thermal energy storage ("TES") devices and/or loops.

The thermal management system 200 may include additional, fewer, or different components than shown in FIG. 2. The TES coolant loop 202 may include, for example, any component designed to increase or otherwise control flow of coolant around the TES coolant loop 202. The primary coolant loop 210 may include any components for cooling the thermal load 214 and/or for transferring heat across heat exchanger 206 to and/or from the coolant of the TES coolant loop 202.

The example of the thermal management system 200 shown in FIG. 2 has an intermediate fluid in the primary coolant loop 210 for cooling the thermal load 214. In alternative examples, heat may be transferred directly between the thermal load 214 and the fluid that passes through the heat exchanger 108 that is in thermal contact with the phase change material 106 of the thermal battery system 100.

More generally, the thermal management system 200 may comprise: a primary heat transfer system configured to transfer heat to or from a thermal load; a processor; and the thermal battery system 100. The processor may be configured to: determine a state of charge of the thermal battery system from the indication of the pressure and the indication of the temperature of the gas, wherein a thermal capacity of the thermal battery system includes the state of charge; determine if a thermal capacity of the primary heat transfer system plus the thermal capacity of the thermal battery system is sufficient to handle the thermal load; and cause the primary heat transfer system and the thermal battery system to transfer heat to or from the thermal load if the thermal capacity of the primary heat transfer system plus the thermal capacity of the thermal battery system is sufficient to handle the thermal load. The primary cooling system 212 is an example of the primary heat transfer system. A primary heating system is an alternative example of the primary heat transfer system.

Figure 3:
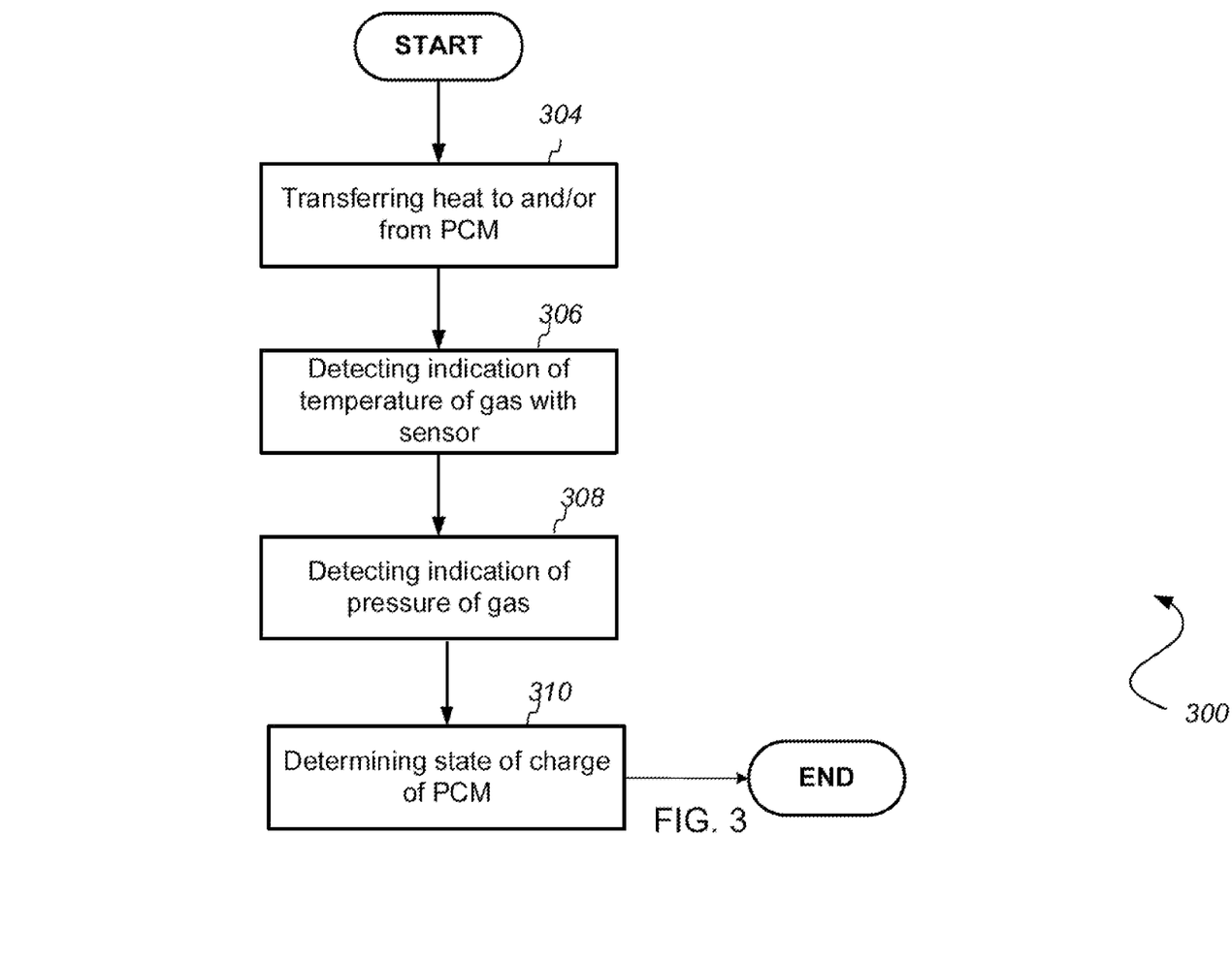
FIG. 3 illustrates a flow diagram of an example of operations for determining a state of charge of phase change material in a thermal battery system.

FIG. 3 illustrates a flow diagram 300 of an example of operations for determining the state of charge of the phase change material 106 in the thermal battery system 100.

Operations may begin by transferring (304) heat to and/or from the phase change material 106. Next, an indication of a temperature of gas 104 is detected (306) with the temperature sensor 112. In addition, an indication of the pressure of the gas 104 may be detected (308) with the pressure sensor 114. Operations may end by determining (310) the state of charge of the phase change material 106 based on the indications of the temperature and the pressure of gas 104.

Additional, fewer, and/or different operations than shown in FIG. 3 may be included. For example, operations may include receiving additional external data including measured heat duty vs. time. Alternatively or in addition, the operations may be performed in a different order than shown.

Figure 4:
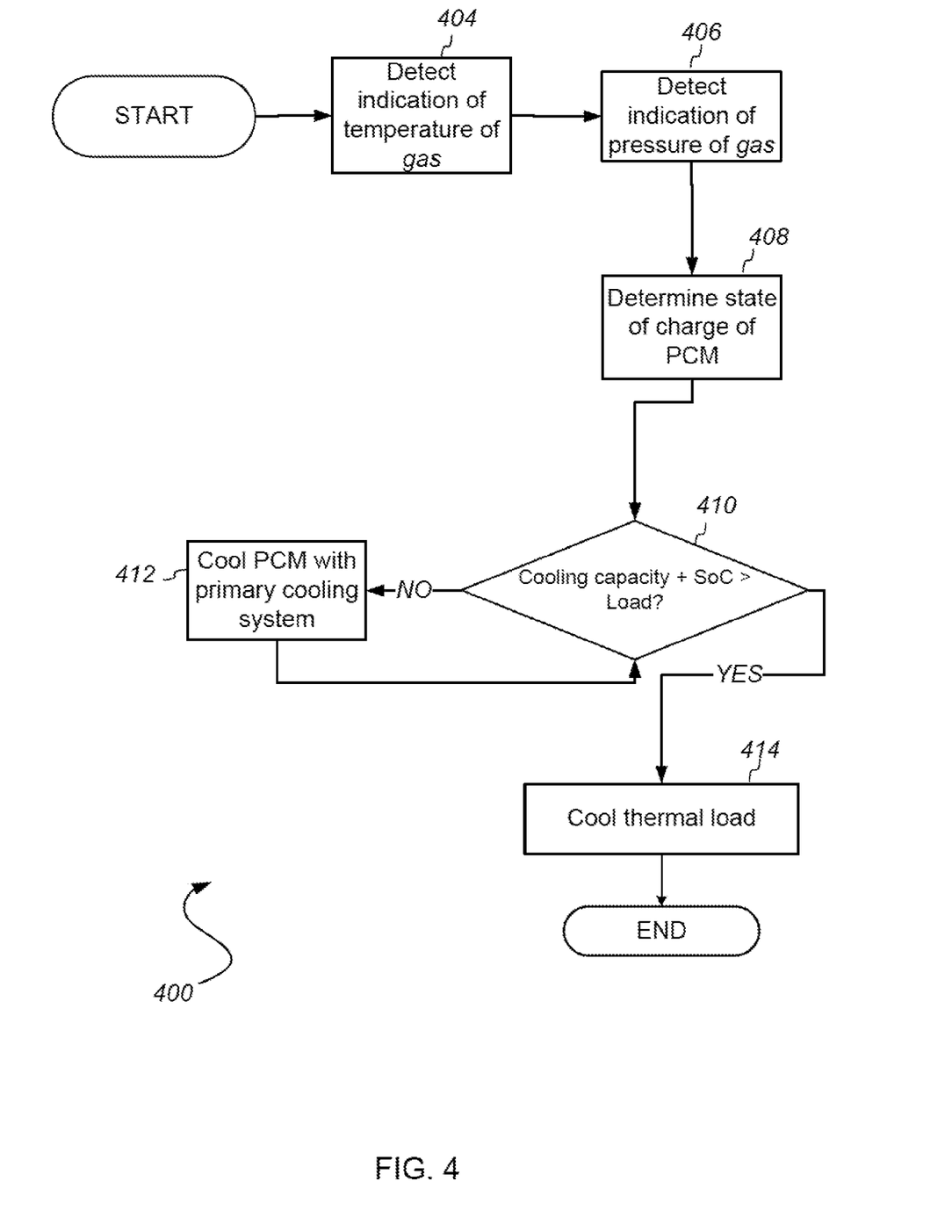
FIG. 4 illustrates a flow diagram of an example of operations in a thermal management system for cooling a thermal load with a thermal battery system.

FIG. 4 illustrates a flow diagram 400 of example operations for cooling the thermal load 214 with the thermal management system 200 using, at least in part, the thermal battery system 100. The flow diagram 400 illustrates only one example. The operations may include additional, fewer, or different operations than illustrated in FIG. 4. Alternatively or in addition, the operations may be performed in a different order than shown in FIG. 4.

Operations may begin by detecting (404) the indication of the temperature of the gas 104 with temperature sensor 112. Next, the indication of the pressure of the gas 104 may be detected (406) by the pressure sensor 114. The state of charge of the phase change material 106 in the thermal battery system 100 may be determined (408) from the indications of the temperature and the pressure of the gas 104.

Next, a determination (410) is made whether a cooling capacity of the primary cooling system 212 plus the state of charge of the thermal battery system 100 is at least as large as the thermal load 214. If it is at least as large as the thermal load 214, then operations may end by causing (414) the primary cooling system 212 and the thermal battery system 100 to cool the coolant in the primary coolant loop 210, which then cools the thermal load 214. Alternatively, if the cooling capacity of the primary cooling system 212 plus the state of charge of the thermal battery system 100 is not at least as large as the thermal load 214, then the primary cooling system 212 cools the phase change material 106 and operations return to the determination (410). In this latter case, the pump 204 may be stopped and/or valves (not shown) may be switched to cause the primary fluid to bypass the heat exchanger 206.

For a relatively slowly heating or cooling profile, heat transfers relatively evenly to the heat exchanger 108 (as time approaches infinity). The temperature, energy state, and/or the phase of the phase change material 106 may be relatively homogeneous. In such scenarios, remaining energy content in the phase change material 106 in kilojoules (kJ), British thermal units (Btu), or any other unit of thermal energy, may be all that is needed to determine go/no-go criteria to add or remove more heat to or from the phase change material 106. In such scenarios, determining of energy content (for example, state of charge) from phase change material density may be perfectly sufficient by using, for example, the thermal battery system 100 shown in FIG. 1.

However, for a rapid heating or cooling profile, more information may be necessary in order to accurately determine energy content in kJ, BTU, or any other units of energy, and real-time cooling/heating capacity (in other words, heat duty) in kW, Btu/hr, Hp or any other units of thermal power. In other words, determining energy content only from the phase change density may not be feasible or adequate due to the following complications. First, phase change material commonly does not transition phase from solid to liquid at a single transition temperature. Instead, the phase change occurs over a range of temperatures, such as over a range of about 5 degrees Celsius. Second, the density of the phase change material 106 may change even outside of transitions between phases. For example, liquid density may vary by more than 20 percent over temperature ranges to which thermal batteries are typically subjected. Third, the heating profile in the heat exchanger 108, and consequently inside of the phase change material 106, may not be even because of the load profile. For example, more heat may be transferred near an inlet to the heat exchanger 108 than near an outlet of the heat exchanger 108 because of a relatively large temperature delta between the inlet and the outlet, and because of the physical arrangement inside of the heat exchanger 108. The thermal battery system 100 described below helps address these complications.

Figure 6:
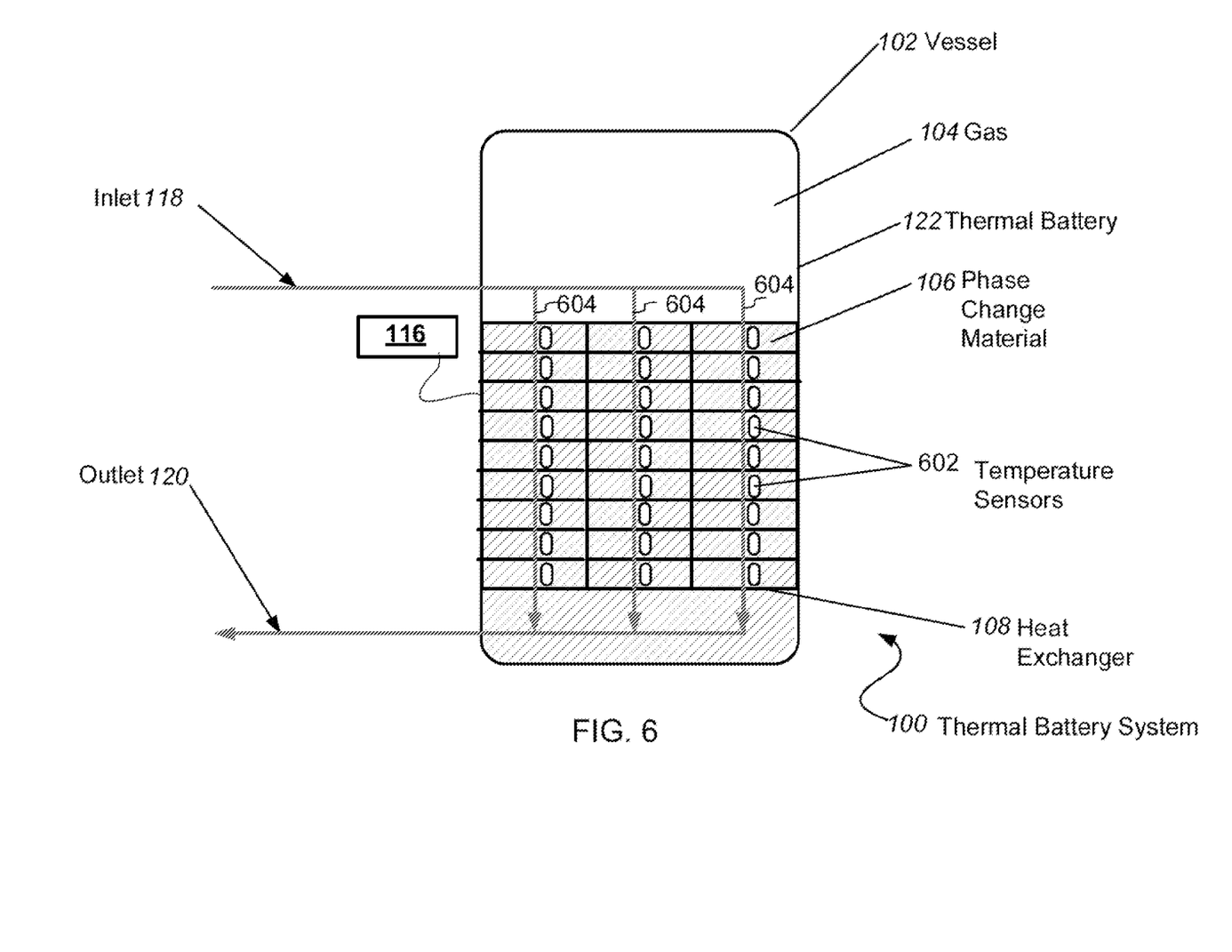
FIG. 6 illustrates an example of a thermal battery system with temperature sensors configured to measure temperatures in phase change material.

FIG. 6 illustrates an example of the thermal battery system 100 with temperature sensors 602 configured to measure temperatures in the phase change material 106. The thermal battery system 100 illustrated includes the vessel 102, the phase change material 106 and the gas 104 in the vessel 102, and heat exchanger 108 in the phase change material 106. The thermal battery system 100 may include only the features shown in FIG. 6. Alternatively, the thermal battery system 100 may also include additional components, such as all or a subset of the components shown FIG. 1 and/or FIG. 5.

The temperature sensors 602 may be arranged in, and associated with, corresponding volumes of the phase change material 106. The volumes corresponding to the temperature sensors 602 in the example shown in FIG. 6 are represented as rectangles within the heat exchanger 108. In some examples, such as the example illustrated in FIG. 6, the temperature sensors 602 and the corresponding volumes of the phase change material 106 are included in the heat exchanger 108. Alternatively, one or more of the temperature sensors 602 in the phase change material 106, and the volumes corresponding to those temperature sensors 602, may be located outside of the heat exchanger 108.

Multiple conduits 604 extend through the volumes corresponding to the temperature sensors 602. The conduits 604 are configured to receive a refrigerant through the inlet 118 of the thermal battery 122. Conversely, the conduits 604 are configured to supply the refrigerant to the outlet 120 of the thermal battery 122. The conduits 604 may be part of the heat exchanger 108. Although the arrows shown in FIG. 6 and the terms inlet 118 and outlet 120 suggest a particular direction of flow of the refrigerant, the direction shown should not be considered limiting. For example, the flow of the refrigerant may be in a direction opposite of that shown in FIG. 6 so that the inlet 118 is effectively an outlet, and the outlet 120 is effectively an inlet. Indeed, in some examples of the thermal battery system 100, the refrigerant may flow in one direction some of the time, and in an opposite direction at other times.

Each respective one of the temperature sensors 602 may include one or more sensors capable of detecting an indication of the temperature of the phase change material 106 in the volume corresponding to the respective one of temperature sensors 602. Examples of the temperature sensors 602 include a thermocouple, a resistance thermometer, or any other device configured to detect temperature. The indication of the temperature of the phase change material 106 may be any value indicative of the temperature, such as a temperature measurement, a measurement of resistance indicative of the temperature, or any other such value. In some examples, a wire (not shown) extends the length of each the conduits 604 and connects the temperature sensors 602 to the processor 116, and the temperature sensors 602 are brazed onto the heat exchanger 108.

The volumes corresponding to the temperature sensors 602 may be any shape and/or size. In FIG. 6, the volumes, which are actually three dimensional, are represented as two dimensional rectangles for simplicity. The volumes may have a uniform size and/or shape. Alternatively or in the addition, or the sizes and/or the shapes of the volumes may vary.

The thermal battery system 100 may determine real-time energy content and/or real-time heat duty available from the thermal battery 122 by obtaining an indication of the temperatures in the volumes from the temperature sensors 602, which form a thermal profile within the phase change material 106. The thermal profile within the phase change material 106 provides greater insight into the state of the phase change material 106 at various physical locations within the heat exchanger 108 and does not assume a homogeneous state.

Each of the temperatures is representative of the physical state, including specific enthalpy, of the corresponding volume of the phase change material 106 at a corresponding location in the heat exchanger 108. The processor 116 may multiply the specific enthalpy at each location, which is a function of the temperature at each location, by the mass of the phase change material 106 in the corresponding volume in order to determine internal energy. The processor 116 may sum the internal energy for each corresponding volume in order to approximate the total internal energy content of the phase change material 106.

The phase change material 106 may have enough energy content (for example, kJ), but the heat exchanger 108 may not be able to transfer that energy rapidly enough (for example, kW) to or from the refrigerant. The processor 116 may determine if the heat exchanger 108 is capable of transferring energy rapidly enough using a suitable algorithm such as the logarithmic mean temperature difference (LMTD). The logarithmic mean temperature difference (LMTD) may be used to determine a heat duty (for example, kW) exchanged during a heat transfer in a heat exchanger. The LMTD is a logarithmic average of the temperature difference between hot and cold feeds at each end of the heat exchanger 108. For example, if the heat exchanger 108 has a constant heat transfer coefficient and a constant heat transfer area, the larger the LMTD, the more heat is transferred between the refrigerant in the conduits 604 and the phase change material 106. The exchanged heat duty, Q, may be determined as Q=U×A×LMTD, where U is the heat transfer coefficient and A is the heat transfer area.

In many configurations, thermal systems are designed so that when the refrigerant passes through a thermal battery, such as the thermal battery 122 illustrated in FIG. 6, the refrigerant is said to be "under the dome" in the liquid-vapor mix area of an enthalpy diagram. In such scenarios, the enthalpy of the refrigerant changes as the refrigerant passes through the thermal battery 122, but the temperature of the refrigerant remains substantially constant. Therefore, in combination with the temperature of the refrigerant and the heat transfer area (also known as thermal resistance) of the heat exchanger 108, the temperature of the volume of the phase change material 106 provides enough information to approximate the heat transfer rate at the location of the volume according to the following equation:

Real-Time Heat Duty$_{volume}$ = [Heat Transfer Area×

(Refrigerant temperature−PCM Temperature)]/(Thermal Resistance)

The processor 116 may calculate the Real-Time Heat Duty$_{volume}$ for all of the volumes. The processor 116 may sum the Real-Time Heat Duty$_{volume}$ for all of the volumes, which provides an approximation for the total real-time heat duty available given the current state of the phase change material 106. The real-time energy content may be obtained by integrating the real-time heat duty over time. Any known numerical technique for determining the mathematical integral may be used, such as approximating the area under a curve by rectangles. The heat transfer area and the thermal resistance may depend, for example, on heat exchanger geometry and on any additives to the phase change material 106, such as graphite.

Alternatively or in addition, the thermal battery system 100 may determine the real-time energy content and/or the real-time heat duty available from the thermal battery 122 by tracking energy or heat duty vs. time in combination with a characterization of the capacity of the heat exchanger 108 as a function of various heat duty vs. time profiles. This is referred to herein as the track and characterization technique. The track and characterization technique may be accomplished by the thermal battery system 100 regardless of whether the thermal battery system 100 includes the temperature sensors 602 configured to measure temperatures in the phase change material 106. In particular, the track and characterization technique may be accomplished by any combination of the following three techniques: (a) external computation of energy transfer or heat duty vs. time; (b) computation of energy or heat duty vs. time by the heat balance of the thermal battery system 100; and (c) direct calculation of heat duty vs. time or energy (heat duty integrated over time) in the thermal battery system 100 by measurement and subsequent calculation of heat duty using one of the following two formulas:

$$\text{Heat Duty} = \text{Mass} \times \text{Specific Heat} \times (\text{Outlet Temperature} - \text{Inlet Temperature}) \qquad (1)$$

$$\text{Heat Duty} = \text{Mass} \times (\text{Outlet Enthalpy} - \text{Inlet Enthalpy}) \qquad (2)$$

—AND— characterization of density of the phase change material 106 in the heat exchanger 108 at various states of energy vs average heat duty. Such characterization may be accomplished by one or both of the following: (i) a physical test of the phase change material 106 in the heat exchanger 108, or scale model, with appropriate measurements and calculation of energy, average heat duty and phase change material density with variance of each parameter for a representative data set; or (ii) a computational analysis of phase change material energy, average heat duty, and phase change material density with variance of each parameter for a representative data set. The characterization of density of the phase change material 106 in the heat exchanger 108 at various states of energy vs average heat duty may be prepared in advance, so as to be predetermined during operation of the thermal battery system 100.

With respect to formulas (1) and (2) in the preceding paragraph, the mass, specific heat, temperatures, and enthalpy are characteristics of the refrigerant. In order to obtain the characterization of density of the phase change material 106 in the heat exchanger 108 at various states of energy versus average heat duty according to technique (i) identified above, a test is run with a set heat duty controlled and applied to the heat exchanger 108 for a measured period of time until all energy stored in the phase change material 106 is dissipated. This will result in a known failure time (time at which the heat exchanger 108 can no longer accept the required heat duty) under a steady load. Heat duty may also be integrated in time over the test period to produce the overall energy available in the heat exchanger. The density of the phase change material 106 may also be tracked using pressure and temperature of the gas 104 in the heat exchanger 108. This test may be repeated for a finite number of relevant heat duties so as to characterize energy content and available heat duty versus density and time for the heat exchanger 108.

In order to obtain the characterization of density of the phase change material 106 in the heat exchanger 108 at various states of energy versus average heat duty according to technique (ii) identified above, a computational analysis of phase change material energy, average heat duty, and phase change material density is performed with a set heat duty applied to the heat exchanger 108 for a predetermined period of time until all energy stored in the phase change material 106 is dissipated according to the computational analysis. The computational analysis may be performed as described in Tilman Barz, et al., "State and state of charge estimation for a latent heat storage," Control Engineering Practice, 72, 151-166 (2018). This computational analysis may be repeated for a finite number of relevant heat duties so as to characterize energy content and available heat duty versus density and time for the heat exchanger 108.

In some examples of the thermal battery system 100, the processor 116 may determine the state of charge or energy differently depending on the variance of the temperatures detected by the temperature sensors 602. If the temperatures detected by the temperature sensors 602 are all within a relatively small temperature delta of each other, then the processor 116 may determine the state of charge or energy based on the indication of the pressure and the indication of the temperature of the gas 104 as described further above. However, if the temperatures detected by the temperature sensors 602 are not all within a relatively small temperature delta of each other, then the processor 116 may determine the state of charge or total energy based on the indication of the temperatures received from the temperature sensors 602. Alternatively or in addition, if the temperatures detected by the temperature sensors 602 are not all within a relatively small temperature delta of each other, then the processor 116 may determine the state of charge or total energy based on the track and characterization technique. Examples of the relatively small temperature delta may include less than five degrees Celsius, less than 10 degrees Celsius, and less than 15 degrees Celsius.

Alternatively or in addition, the processor 116 may determine whether the thermal battery system 100 is capable of transferring energy rapidly enough for an upcoming heat transfer depending on the speed of the upcoming heat transfer. For example, if an upcoming heat transfer is to be a relatively slow heat transfer, then the processor 116 may simply consider the thermal battery system 100 as being capable of providing the upcoming heat transfer as long as the state of charge is sufficient for the upcoming heat transfer. Alternatively, if the upcoming heat transfer is not going to be a relatively slow heat transfer, then the processor 116 may determine the real-time heat duty based on the indication of temperatures from the temperature sensors 602 or based on the track and characterization technique.

Figure 7:
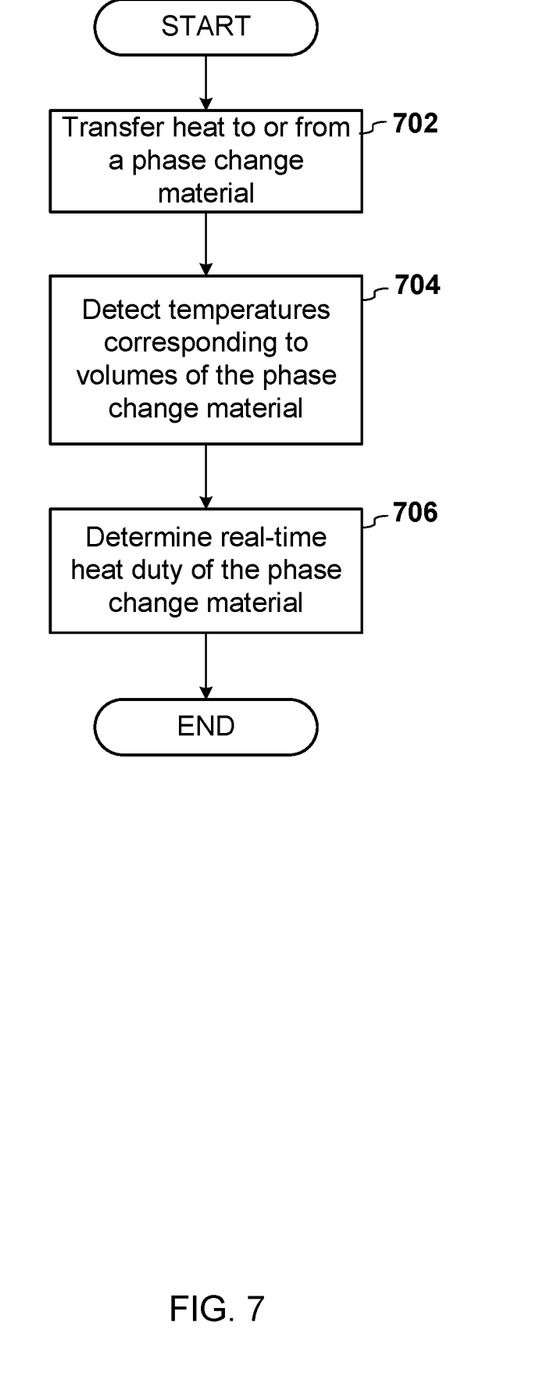
FIG. 7 is a flow diagram illustrating example operations of the thermal battery system shown in FIG. 6.

FIG. 7 is a flow diagram illustrating example operations of the thermal battery system 100 shown in FIG. 6. The operations may be performed in a different order than shown in FIG. 7.

Operations may begin by transferring (702) heat to and/or from the phase change material 106 in the vessel 102 via the heat exchanger 108. For example, a refrigerant may flow from the inlet 118 to the outlet 120 through the heat exchanger 108.

The indication of temperatures corresponding to individual volumes of the phase change material 106 may be detected (704) with the temperature sensors 602.

A real-time heat duty of the phase change material may be determined (706) from the indication of the temperatures corresponding to the individual volumes of the phase change material 106 with the temperature sensors 602.

The operations of the thermal battery system 100 may include additional, fewer, and/or different operations than shown in FIG. 7. For example, the operations of the thermal battery system 100 may also include, for example, the operations shown in FIG. 3.

In examples of the present disclosure, the term "partially open," as used herein, unless stated otherwise, alone or in combination with other terms, may refer to any position of a valve between the position of being completely open (in other words, 100%) open and completely closed (in other words, 0% open). A partially open position may advantageously vary by example. A partially open position, in certain examples, may be such position such that a valve may advantageously increase or decrease pressure in fluid to a small degree, and/or advantageously increase or decrease temperature in fluid to a small degree, and/or advantageously increase or decrease fluid flow to a small degree. Such partially open positions providing specific advantageous pressure and/or temperature and/or flow conditions to fluid as necessary, desirable, or preferable may be understood by a person of ordinary skill.

The terms "ambient environment," "ambient atmosphere," and/or "ambient atmospheric," may refer to space immediately adjacent to and/or surrounding a thermal battery system and/or a thermal management system of the present disclosure. In the context of the thermal management system, the "ambient environment" also applies to a VCS or a TPPL included in the thermal management system. Alternatively, or in addition, the terms "ambient environment," "ambient atmosphere," and/or "ambient atmospheric" may refer to space outside of a thermal battery system and/or a thermal management system of the present disclosure that is thermally coupled to at least one component of a thermal battery system and/or a thermal management system of the present disclosure. The term "ambient temperature" may refer to the temperature of the air or other fluid in the ambient environment. The term "ambient pressure" may refer to the pressure of the air, atmosphere, or other fluid in the ambient environment.

For the purpose of this disclosure, the terms "about" and "substantially" are used herein with respect to measurable values and ranges due to expected variations known to those skilled in the art (for example, accuracy limitations and variability in measurements).

In describing elements of the present disclosure, the ordinal number terms "$1^{st}$," "$2^{nd}$," "first," "second," and the like, may be used herein. These ordinal number terms are only used to distinguish one element from another element, but do not limit the corresponding elements irrespective of the nature or order of the corresponding elements.

In describing elements of the present disclosure, the terms "upstream" and "downstream" refer to the relative direction with respect to fluid flow in a fluid pathway. For example, "upstream" refers to the direction from which the fluid flows, and "downstream" refers to the direction to which the fluid flows.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

All methods described herein may be performed in any suitable order unless otherwise indicated herein or otherwise clearly contradicted by context.

While various examples have been described, it will be apparent to those of ordinary skill in the art that many more implementations are possible. Accordingly, the examples described herein are not the only possible implementations.

The subject-matter of the disclosure may also relate, among others, to the following aspects:

A first aspect relates to a thermal battery system comprising: a vessel comprising a phase change material and a gas; a heat exchanger configured to transfer heat to or from the phase change material; a temperature sensor configured to detect an indication of a temperature of the gas; a pressure sensor configured to detect an indication of a pressure of the gas; and a processor configured to determine a state of charge of the thermal battery system from the indication of the pressure and the indication of the temperature of the gas.

A second aspect relates to the thermal battery system of aspect 1, wherein the processor is configured to determine the state of charge from a total volume of the phase change material, wherein the processor is configured to determine the total volume of the phase change material from a total volume of the gas, and wherein the processor is configured to determine the total volume of the gas from the indication of the pressure and the indication of the temperature of the gas.

A third aspect relates to the thermal battery system of any preceding aspect, wherein the processor is configured to look up the state of charge in a mapping based on the indication of the pressure and the indication of the temperature of the gas.

A fourth aspect relates to the thermal battery system of any preceding aspect, wherein the processor is configured to look up the state of charge in a mapping, which maps a phase change material density to the state of charge, wherein the processor is configured to determine a density of the phase change material from the indication of the pressure and the indication of the temperature of the gas.

A fifth aspect relates to the thermal battery system of any preceding aspect, wherein the vessel further comprises a diaphragm disposed between the gas and the phase change material, wherein the pressure sensor is configured to measure a deflection of the diaphragm.

A sixth aspect relates to the thermal battery system of any preceding aspect further comprising a plurality of temperature sensors configured to detect an indication of a plurality of temperatures in a plurality of corresponding volumes of the phase change material, wherein the processor is configured to determine a real-time heat duty of the thermal battery system based on the indication of the temperatures detected by the temperature sensors.

A seventh aspect relates to the thermal battery system of the sixth aspect, wherein the state of charge is a first state of charge, and wherein the processor is further configured to determine a second state of charge of the thermal battery system via a mathematical integration of the real-time heat duty over time.

An eighth aspect relates to the thermal battery system of the seventh aspect, wherein the processor is configured to select the first state of charge or the second state of charge depending on a variance in the temperatures in the corresponding volumes of the phase change material.

A ninth aspect relates to the thermal battery system of any preceding aspect, wherein the processor is configured to determine a real-time heat duty of the thermal battery system based on a change in enthalpy of a refrigerant that passes through the heat exchanger.

A tenth aspect relates to the thermal battery system of any preceding aspect, wherein the processor is configured to determine a real-time heat duty of the thermal battery system based on a change in temperature of a refrigerant that passes through the heat exchanger.

An eleventh aspect relates to a method of determining a capacity of a thermal battery, comprising: transferring heat to and/or from a phase change material in a vessel via a heat exchanger; detecting an indication of a plurality of temperatures corresponding to a plurality of volumes of the phase change material with a plurality of temperature sensors; and determining a real-time heat duty of the phase change material from the indication of the temperatures corresponding to the volumes of the phase change material with temperature sensors.

A twelfth aspect relates to the method of the eleventh aspect further comprising determining the real-time heat duty of the phase change material by determining a real-time heat duty for each of the volumes of the phase change material based on a heat transfer area and thermal resistance at locations in the heat exchanger associated with the volumes and by summing the real-time heat duty for each of volumes.

A thirteenth aspect relates to the method of any preceding aspect, wherein the vessel further comprises a gas, the method further comprising: detecting an indication of a temperature of the gas with a temperature sensor; detecting an indication of a pressure of the gas with a pressure sensor; and determining a state of charge of the phase change material from the indication of the pressure of the gas and the indication of the temperature of the gas.

A fourteenth aspect relates to the method of the thirteenth aspect, wherein the state of charge of the phase change material is determined from the indication of the pressure of the gas and the indication of the temperature of the gas when the temperatures corresponding to the volumes of the phase change material are less than a predetermined temperature, and the state of charge of the phase change material is determined by integrating the real-time heat duty of the phase change material over time when the temperatures corresponding to the volumes of the phase change material are greater than the predetermined temperature.

A fifteenth aspect relates to the method of any preceding aspect, wherein the state of charge of the phase change material is determined from the indication of the pressure of the gas and the indication of the temperature of the gas by determining a total volume of the gas from the indication of the pressure and the indication of the temperature of the gas and determining a total volume of the phase change material by subtracting the total volume of the gas from the volume of the vessel.

A sixteenth aspect relates to the method of the fifteenth aspect, wherein the state of charge of the phase change material is determined by determining an average density of the phase change material as the mass of the phase change material divided by the total volume of the phase change material, and looking up the state of charge in a mapping that maps phase change material densities to the state of charge of the phase change material or to an enthalpy of the phase change material.

A seventeenth aspect relates to the method of any preceding aspect, wherein the state of charge of the phase change material is determined by determining an average density of the phase change material as the mass of the phase change material divided by a total volume of the phase change material, and determining an enthalpy of the phase change material from the average density of the phase change material.

An eighteenth aspect relates to a thermal management system comprising: a primary heat transfer system configured to transfer heat to or from a thermal load; a processor; and a thermal battery system comprising a vessel including a phase change material and a gas, a heat exchanger thermally coupled to the phase change material, a temperature sensor configured to detect an indication of a temperature of the gas, and a pressure sensor configured to detect an indication of a pressure of the gas; wherein the processor is configured to: determine a state of charge of the thermal battery system from the indication of the pressure and the indication of the temperature of the gas, wherein a thermal capacity of the thermal battery system includes the state of charge; determine if a thermal capacity of the primary heat transfer system plus the thermal capacity of the thermal battery system is sufficient to handle the thermal load; and cause the primary heat transfer system and the thermal battery system to transfer heat to or from the thermal load if the thermal capacity of the primary heat transfer system plus the thermal capacity of the thermal battery system is sufficient to handle the thermal load.

A nineteenth aspect relates to the thermal management system of the eighteenth aspect, wherein the processor is further configured to determine a real-time heat duty of the thermal battery system, wherein the thermal capacity of the thermal battery system includes the real-time heat duty, and wherein the thermal capacity of the primary heat transfer system plus the thermal capacity of the thermal battery system is sufficient to handle the thermal load if a real-time heat duty of the primary heat transfer system plus the real-time heat duty of the thermal battery system suffices to cool or heat the thermal load quickly enough.

A twentieth aspect relates to the thermal management system of the nineteenth aspect further comprising a plurality of temperature sensors configured to detect an indication of a plurality of temperatures in a plurality of corresponding volumes of the phase change material, wherein the processor is configured to determine a real-time heat duty of the thermal battery system based on the indication of the temperatures detected by the temperature sensors.

In addition to the features mentioned in each of the independent aspects enumerated above, some examples may show, alone or in combination, the optional features mentioned in the dependent aspects and/or as disclosed in the description above and shown in the figures.

What is claimed is:

1. A method of determining a capacity of a thermal battery, the method comprising:
   detecting, with a plurality of temperature sensors, an indication of a plurality of temperatures corresponding to a plurality of volumes of a phase change material in a vessel;
   detecting, with a temperature sensor of the plurality of temperature sensors, an indication of a temperature of a gas adjacent to the phase change material;
   detecting, with a pressure sensor, an indication of a pressure of the gas;
   determining, when the plurality of temperatures corresponding to the plurality of volumes of the phase change material is less than a predetermined temperature, a state of charge of the phase change material from the indication of the pressure of the gas and the indication of the temperature of the gas by determining a total volume of the gas from the indication of the pressure and the indication of the temperature of the gas and determining a total volume of the phase change material by subtracting the total volume of the gas from the volume of the vessel;
   determining, when the plurality of temperatures corresponding to the plurality of volumes of the phase change material is greater than the predetermined temperature, a real-time heat duty of the phase change material from the indication of the temperatures corresponding to the volumes of the phase change material with the plurality of temperature sensors and determining the state of charge of the phase change material by integrating the real-time heat duty of the phase change material over time; and
   supplementing a primary cooling system configured to cool a thermal load by cooling the thermal load with the thermal battery if the state of charge of the phase change material is greater than or equal to a predetermined charge level.

2. The method of claim 1, further comprising:
   transferring heat to and/or from the phase change material via a heat exchanger.

3. The method of claim 1, further comprising:
   determining the real-time heat duty of the phase change material by determining a real-time heat duty for each of the plurality of volumes of the phase change material based on a heat transfer area and thermal resistance at locations in a heat exchanger associated with the plurality of volumes and by summing the real-time heat duty for each of the plurality of volumes.

4. The method of claim 1, further comprising:
   measuring, with the pressure sensor, a deflection of a diaphragm of the vessel, the diaphragm disposed between the gas and the phase change material.

5. A method of determining a capacity of a thermal battery, the method comprising:
   detecting, with a temperature sensor, an indication of a temperature of a gas in a vessel comprising a phase change material;
   detecting, with a pressure sensor, an indication of a pressure of the gas;
   determining a total volume of the phase change material based on the indication of the temperature and the indication of the pressure;
   determining an average density of the phase change material as the mass of the phase change material divided by the total volume of the phase change material, determining a state of charge of the phase change material from the average density of the phase change material by looking up the state of charge in a mapping that maps phase change material densities to at least one of the state of charge of the phase change material or to an enthalpy of the phase change material, and supplementing a primary cooling system configured to cool a thermal load by cooling the thermal load with the thermal battery if the state of charge of the phase change material is greater than or equal to a predetermined charge level.

6. The method of claim 5, wherein determining the total volume of the phase change material based on the indication of the temperature and the indication of the pressure comprises:

determining a total volume of the gas from the indication of the temperature and the indication of the pressure; and determining the total volume of the phase change material by subtracting the total volume of the gas from a volume of the vessel.

7. The method of claim 5, further comprising:
transferring heat to and/or from the phase change material via a heat exchanger.

8. The method of claim 5, further comprising:
detecting, with a plurality of temperature sensors, an indication of a plurality of temperatures corresponding to a plurality of volumes of the phase change material.

9. The method of claim 8, further comprising:
determining a real-time heat duty of the phase change material from the indication of the temperatures corresponding to the volumes of the phase change material.

10. The method of claim 5, further comprising:
determining a real-time heat duty of the phase change material by determining a real-time heat duty for each of a plurality of volumes of the phase change material based on a heat transfer area and thermal resistance at locations in a heat exchanger associated with the plurality of volumes and by summing the real-time heat duty for each of the plurality of volumes.

11. The method of claim 5, further comprising:
measuring, with the pressure sensor, a deflection of a diaphragm of the vessel, the diaphragm disposed between the gas and the phase change material.

\* \* \* \* \*